(12) United States Patent
Carroll et al.

(10) Patent No.: US 11,875,382 B2
(45) Date of Patent: Jan. 16, 2024

(54) SOFTWARE APPLICATION CUSTOMIZED FOR TARGET MARKET

(71) Applicant: GO DADDY OPERATING COMPANY, LLC, Scottsdale, AZ (US)

(72) Inventors: James Carroll, Kirkland, WA (US); Philip Davidson, Carnation, WA (US); Thyagarajan Lakshmanan, San Jose, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 281 days.

(21) Appl. No.: 17/062,211

(22) Filed: Oct. 2, 2020

(65) Prior Publication Data
US 2021/0233112 A1     Jul. 29, 2021

Related U.S. Application Data

(63) Continuation of application No. 15/487,868, filed on Apr. 14, 2017, now abandoned, which is a continuation of application No. 14/309,813, filed on Jun. 19, 2014, now Pat. No. 9,659,106.

(51) Int. Cl.
| | | |
|---|---|---|
| *G06Q 30/02* | (2023.01) | |
| *G06Q 30/0251* | (2023.01) | |
| *G06F 16/958* | (2019.01) | |
| *G06F 16/957* | (2019.01) | |
| *H04L 67/52* | (2022.01) | |
| *G06F 16/35* | (2019.01) | |
| *H04L 67/02* | (2022.01) | |

(52) U.S. Cl.
CPC ......... *G06Q 30/0261* (2013.01); *G06F 16/35* (2019.01); *G06F 16/9577* (2019.01); *G06F 16/986* (2019.01); *H04L 67/02* (2013.01); *H04L 67/52* (2022.05)

(58) Field of Classification Search
CPC . G06Q 30/0261; G06F 16/35; G06F 16/9577; G06F 16/986; H04L 67/02; H04L 67/52; H04L 67/01; H04L 67/025
See application file for complete search history.

(56) References Cited

U.S. PATENT DOCUMENTS

| | | | |
|---|---|---|---|
| 5,924,090 A * | 7/1999 | Krellenstein | ......... G06F 16/951 707/999.005 |
| 8,165,911 B1 * | 4/2012 | Sanil | .................. G06Q 30/0205 705/7.34 |
| 2010/0235411 A1 | 9/2010 | Bray | |

(Continued)

*Primary Examiner* — Pierre M Vital
*Assistant Examiner* — Cecile H Vo
(74) *Attorney, Agent, or Firm* — GREENBERG TRAURIG, LLP

(57) ABSTRACT

A system and method are presented for customizing a software application for a target market. A request to access an application is received, by one or more computer servers, from a user. At least one of a preferred language of the user and a location of the user are determined by the one or more computer servers, and a target market is determined using the at least one of the preferred language of the user and the location of the user. The target market defines a language and a region. The application is rendered by the one or more computer servers by modifying at least one of a user interface of the application and a content of the application using the target market.

20 Claims, 8 Drawing Sheets

(56) References Cited

U.S. PATENT DOCUMENTS

| | | | | |
|---|---|---|---|---|
| 2010/0332583 A1* | 12/2010 | Szabo | ............... | G06F 16/24578 |
| | | | | 709/217 |
| 2012/0123924 A1* | 5/2012 | Rose | ....................... | A63F 13/00 |
| | | | | 705/35 |
| 2014/0149845 A1* | 5/2014 | Ansel | ....................... | G06F 16/35 |
| | | | | 715/234 |
| 2015/0186539 A1* | 7/2015 | Simhon | ................. | G06F 16/435 |
| | | | | 707/723 |
| 2015/0371222 A1* | 12/2015 | Carroll | .................... | H04L 67/52 |
| | | | | 705/39 |
| 2017/0221102 A1* | 8/2017 | Carroll | ................ | G06F 16/9577 |

* cited by examiner

US 11,875,382 B2

SOFTWARE APPLICATION CUSTOMIZED FOR TARGET MARKET

CROSS-REFERENCE TO RELATED APPLICATIONS

This application is a continuation of U.S. patent application Ser. No. 14/309,813 entitled "SOFTWARE APPLICATION CUSTOMIZED FOR TARGET MARKET" and filed on Jun. 19, 2014.

FIELD OF THE INVENTION

The present invention generally relates to the modification or optimization of website content for a given market or locale.

BACKGROUND

A network is a collection of links and nodes (e.g., multiple computers and/or other devices connected together) arranged so that information may be passed from one part of the network to another over multiple links and through various nodes. Examples of networks include the Internet, the public switched telephone network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as web pages. Websites comprise a collection of connected or otherwise related web pages. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Websites may consist of a single webpage, but typically consist of multiple interconnected and related web pages. Websites, unless extremely large and complex or exposed to unusual traffic demands, typically reside on a single server and are prepared and maintained by a single individual or entity. Menus and links may be used to move between different web pages within the website or to move to a different website as is known in the art. The interconnectivity of web pages enabled by the Internet can make it difficult for Internet users to tell where one website ends and another begins.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, the browser requests and receives information for the webpage, typically in the form of an HTML document, and then displays the webpage content for the user. The user then may view other web pages at the same website or move to an entirely different website using the browser.

When a website administrator develops a website, they often have a target market in mind. The target market is often associated with a particular geographical region, such as a group of customers in a particular region or country. Given that target market, the website administrator would usually prefer to create the website with content likely to be suitable for individuals visiting the website from the target market. However, the tools made available to assist in website creation and design are often configured to generate websites having content suited more to the location of the company supplying the tool than the website administrator or the target market for the website.

For example, a website administrator may wish to construct a website directed to customers located in China. However, if the website administrator uses a software application provided by an American company to develop the website, the software application will generate content (e.g., copy, stock multimedia, default web page templates, etc.) more suited to an American target market than a Chinese target market.

DETAILED DESCRIPTION

Figure 1:
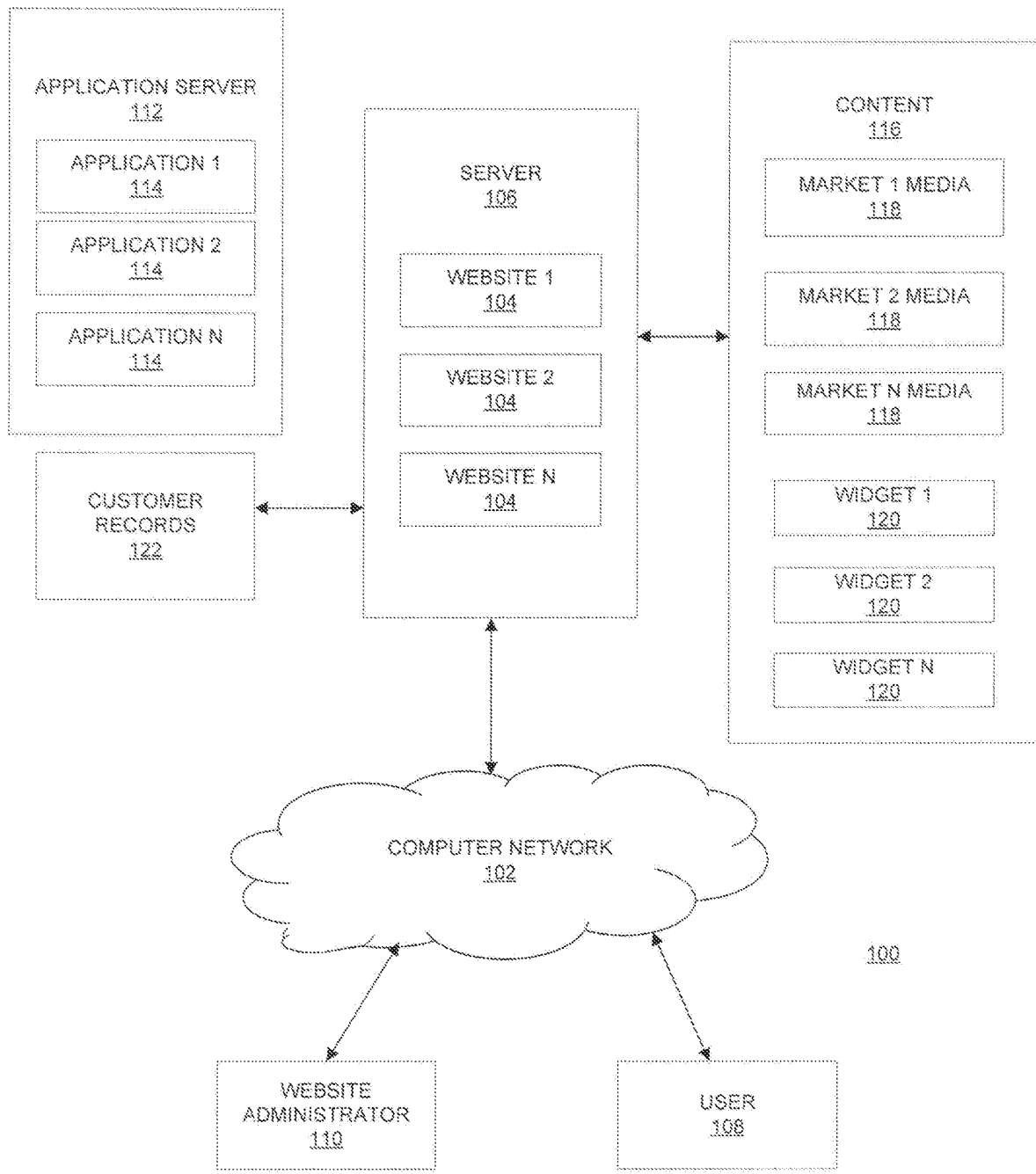
FIG. 1 is a block diagram of a system that may be used to optimize website content for a target market.

The present invention will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

In many cases, websites are developed using tools and libraries provided by third parties. For example, a hosting provider may often provide a website builder tool or shopping cart software to assist a website administrator in constructing and publishing a website. Often, however, these tools are configured to generate content that is more suited to the location in which the hosting provider resides than the location in which the target audience for the website resides (i.e., the target market for the website).

Accordingly, the present disclosure provides a system and method configured to determine a suitable target market or locale for a particular website, and then generate and make available content and applications or widgets for incorporation into the website that are suited to that target market. The content may then be incorporated into the website manually, or may automatically be incorporated into the website upon being requested by a user.

FIG. 1 is a block diagram of system 100 that may be used to practice the present invention. A computer network 102 may be a collection of links and nodes (e.g., multiple computers and/or other devices connected together) arranged so that data may be passed from one part of the computer network 102 to another part of the computer network 102. The computer network 102 may span the entire world and allow communication from any point in the world to any other point in the world where the computer network 102 exists. Examples of computer networks 102 include the Internet, the public switched telephone network, computer networks (e.g., an intranet, an extranet, a local-area network, or a wide-area network), wired networks, and wireless networks.

The Internet is a worldwide network of computers and computer networks arranged to allow the easy and robust exchange of information between websites 104 on hardware servers 106 and Internet users 108 and website administrators 110 on client computers. Hundreds of millions of people around the world have access to client computers connected to the Internet via Internet Service Providers (ISPs).

Content providers may place multimedia information or content (e.g., text, graphics, audio, video, animation, and other forms of data) at specific locations on the Internet referred to as websites 104. The combination of all the websites 104 and their corresponding web pages on the Internet is generally known as the World Wide Web (WWW) or simply the Web.

For Internet users 108 (e.g., individuals that use computers to access the content on one of websites 104) and website administrators 110 (e.g., individuals that manage, modify, update, and reconfiguration websites 104) alike, the Internet continues to be increasingly valuable. Prevalent on the Internet are multimedia websites 104, some of which may offer and sell goods and services to individuals and organizations. Websites 104 may consist of a single webpage, but typically consist of multiple interconnected and related web pages. Websites 104, unless very large and complex or having unusual traffic demands, typically reside on a single hardware server 106 and are prepared and maintained by a single website administrator 110, which may be an individual, group of individuals, or entity (although websites 104 residing on multiple hardware servers 106 are certainly possible and even necessary in some cases). Menus, links, tabs, etc. on the website 104 may be used to move between different web pages within the website 104 or to move to an entirely different website.

Websites 104 may be created using HyperText Markup Language (HTML) to generate a standard set of tags that define how the web pages for the websites 104 are to be displayed. Internet users 108 may access content providers', such as businesses, websites 104 using software known as an Internet browser, such as MICROSOFT INTERNET EXPLORER, MOZILLA FIREFOX, or GOOGLE CHROME.

After the browser has located the desired webpage, the browser requests and receives the content of the desired web page, typically in the form of an HTML document, from server 106 and then displays the web page content for the Internet user 108 on the client computer using the browser. The Internet user 108 may then view other web pages at the same website 104 or move to an entirely different website using the browser.

Some website administrators 110, typically those that are larger and more sophisticated, may provide their own hardware server(s) 106, software, and connections to the Internet. But many website administrators 110 either do not have the resources available or do not want to create and maintain the infrastructure necessary to host their own websites 104. To assist such individuals (or entities), hosting providers exist that offer website 104 hosting services on one or more servers 106. The hosting providers or other third parties may also provide one or more software applications 114 to assist a website administrator 110 in constructing their website 104. The software applications 114 may include website builders for conventional and/or mobile-oriented websites 104, checkout or purchase processing software, marketing tools, and other software widgets that can be incorporated into the website 104.

The software applications may be provided by one or more application servers 112 that are in communication with server 106. Applications servers 112 may be implemented as separate computer servers from server 106, and so may be distributed over a geographical region. Or, in other cases, application servers 112 may be implemented on or by server 106.

System 100 includes a content database 116. Content database 116 is in communication with server 106 and stores content that may be incorporated into one or more of websites 104. The content stored in content database 116 may include media 118, which may include images, video, and music suitable for incorporation into websites 104, programs, links to third party content, and the like. Within content database 116, the content, including media 118, can be associated with particular markets. One or more website templates may be defined that include a number of different web pages including default content selected from content database 116. The templates themselves may also be associated with one or more target markets.

In many instances, the association of an article of media 118 with a particular market indicates that the media 118 either depicts or is associated with an element of the target market. For example, media 118 may be associated with a particular target market if the media 118 includes or depicts the same language as that of the market or depicts a scene either associated with the market or located in the market. Media 118 may be associated with a single target market, or a number of different target markets.

Content server 116 may also store a number of widgets 120 that can be incorporated into websites 104. Widgets 120 may display content on websites 104 or otherwise modify the content depicted via websites 104. In some cases, widgets 120 may include small programs that can be embedded within a website 104 to modify the operation of the website 104. The content generated by the widgets 120 may be content created by the widgets 120 themselves, or retrieved from third party sources. Example widgets 120 includes FACEBOOK plug-ins, daily weather forecast plug-ins, TWITTER plug-ins, games, YOUTUBE plug-ins, clocks, and the like.

As in the case of media 118, the widgets 120 may be associated with one or more target markets. The association of a widget 120 with a particular target market may indicate that the widget 120 displays text in a language or depicts other content associated with a particular target market. Alternatively, or in combination, the association of a widget 120 with a particular target market may also indicate that the widget 120 is popular within the target market. The widgets 120 may be associated with one or more target markets in a similar fashion to media 118.

Using the present system, website administrator 110 may access server 106 for the purpose of hosting, creating, or modifying a website 104. To do so, the website administrator 110 may log into an authentication website provided by server 106. Once authenticated, the website administrator 110 can execute one or more applications 114 that are configured to assist in the process of creating, editing, and managing website 104, for example, by incorporating one or more media 118 into website 104. Additionally, the website administrator 110 may incorporate one or more widgets 120 into the website 104 to depict desired content. Alternatively, the website administrator 110 may execute an application 114 configured to assist the website administrator 110 in marketing or otherwise advertising the website 104.

Either before or while the website administrator 110 constructs or edits website 104, the present system 100 is configured to identify a target market for the website 104 or website administrator 110. The target market generally describes a geographical region in which the anticipated consumers for or visitors to the website 104 reside. The target market may include a particular country, region (either contained within a single country or being located across portions of multiple countries), state or county, city, or other defined region.

In the present system, the target market identifies both a geographical region and a language. The target market may be specified, for example, according to the BCP-47 industry format, which defines a standard for tag identifiers for location and language. Accordingly, in regions where many languages may be spoken, the target market can set forth not only the geographical region in which the target market resides, but also which of the several spoken languages in the geographical region is preferred.

In some embodiments, the website administrator 110 may explicitly set forth or define the target market for website 104. For example, the website administrator 110 may establish a customer account with a hosting provider providing server 106 before creating website 104. The creation of a customer account may involve the website administrator 110 supplying various customer account details that are stored by the hosting provider in customer records database 122. When creating the customer account (or updating it at a later date), the website administrator 110 may explicitly inform the hosting provider of the target market for the website 104. This may involve the website administrator 110 specifying a particular target language for the website 104 as well as a target geographical region. The website administrator 110 may select the target market in which the majority of customers or potential customers for the website 104 are located.

In other cases, the website administrator 110 may specify a target market without establishing or otherwise modifying customer account information. For example, when the website administrator 110 accesses the server 106 for the purpose of creating a new website 104, modifying an existing website 104, or performing any other task, the server 106 may depict a user interface (e.g., a web page) that includes a menu (e.g., a pull down menu or radio button menu) that allows the website administrator 110 to select a target market that may include both a target region and a target language. Example choices of target market in the menu include: "United States—English", "Estados Unidos—Espanol", "Singapore—English", "Canada—English", "Canada—Français", and the like. Once selected, the server 106 may save the selected target market (e.g., in a cookie stored on the computer of the website administrator 110 for later use. Although this selection may not be made explicitly in conjunction with the action of creating a website 104, once the selection is made, server 106 may be configured to remember the selection and use the selection as the target market for any websites 104 created by the website administrator 110 going forward.

Although the website administrator 110 may explicitly set forth the target market for the website 104, in other embodiments, the target market can be determined or inferred based upon information acquired (e.g., by server 106) either about the website administrator 110, a business of the website 104 or website administrator 110 or otherwise associated with the website 104, the content of the website 104, and the like.

In some embodiments, for example, server 106 is configured to determine a location of the website administrator 110 based upon the IP address of the computer used by the website administrator 110 to access server 106. Using a suitable geolocation service, for example, the server 106 can translate the website administrator 110 IP address into a location. The server 106 may then use a look up table to translate that location into a target market. For example, if the website administrator 110 is determined to be located in a particular country, the market may be set to that country with the language being set to the predominant language in the region. The look up table may contain a number of location-defined target markets, where the potential target markets may include various regions, such as countries, regions, cities, and the like, with one or more languages being defined for each region.

Although the server 106 may perform a location lookup using the IP address of the website administrator 110, in cases where the website administrator 110 is communicating with server 106 using a mobile device, such as a smart phone, the mobile device may provide location information directly to server 106, where the location information may be determined by a location service (e.g., a global positioning system (GPS)) running on the mobile device. In that case, rather than convert an IP address into a location via a geolocation service, the service 106 can use the location information provided directly by the mobile device to determine a location of the website administrator 110.

In some cases, server 106 may use the language preferences of the website administrator 100 (potentially in combination with other information) to determine the target market. Where the website administrator 110 interacts with the server 106 using a web browser, for example, the web browser may have a language preference setting that is accessible to the server 106. Alternatively, other language preference settings specified in other applications running on the computer device of the website administrator 110 may be accessible to the server 106. In that case, the server 106 can retrieve the language preference setting from the web browser or other application and use the language preference setting to identify a target market. Again, this may be done using a lookup table that translates languages into target markets.

The language preference setting may also be used to select from multiple languages that may be used in a particular target market region. For example, if the server 106 determines that the website administrator 110 is located in the United States, in which English and Spanish may be prominent languages, the language preference setting can be used to select between the two prominent languages. For example, if the website administrator's browser has a language preference setting of Spanish, then the market may be defined as United States—Spanish, for example.

Figure 2:
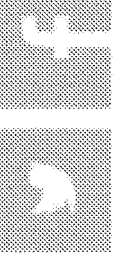
FIG. 2 is a screenshot showing a user interface enabling a website administrator to provide information describing a business associated with a website.

Other information that may be used by server 106 to determine a target market for the website 104 of the website administrator 110 includes information describing a business associated with the website 104. The address of the business can be used to identify a location and, thereby, a target market for the website 104, for example. Similarly, if accessible to the server 106, information describing the sales activity of the business, such as the predominant locations in which customers reside or to which products are shipped, can be used to determine the target market. In some cases, the information describing the business associated with the website 104 may be gathered via a user interface provided to the website administrator 110 by the server 106. The user interface may prompt the website administrator 110 to provide information such as the billing address for the business, which may be used to calculate a target market. In some cases, the website administrator 110 may be prompted to explicitly specify the target market for the business and/or the website 104. For example, to illustrate, FIG. 2 shows an example user interface enabling the website administrator 110 to provide information describing the business associated with the website 104. The information provided by the user, such as the address and phone number (and, optionally, any other information provided by the website administrator 110) may be utilized to determine a target market.

Similarly, the web traffic to the website 104 can be used to identify a target market for the website 104. By analyzing the origination point of visitors to the website 104, server 106 can determine the location of the majority of the visitors to the website 104. That location can then be used (e.g., via a lookup table) to determine the target market. Similarly, the language settings of the website 104 and the language settings of the visitors to the website 104 can all be used to assist in determining the target market and/or selecting a particular language for the target market. In some cases, the target market for the website 104 may be determined in an ad hoc fashion, where a new target market is calculated for each visitor to the website 104, where the target market is determined by the location of the visitor and, if available, the visitor's language settings.

In some embodiments, the type of device used by the website administrator 110 to access server 106 can be used in determining the target market or will otherwise affect the determination of the target market. If, for example, the device is desktop computer, which tend to be less mobile than some other computing devices, it may be assumed that the desktop computer is located in the target market. In that case, the location of the desktop computer can determine the target market, including the language of the target market. If, however, the device used by the website administrator 110 is a portable device (e.g., a mobile device), it is more likely that the website administrator 110 may be traveling. In that case, because the device may not be located in the target market (or at least is less likely to be located in the target market), server 106 may be configured to use only the language setting of the mobile device to determine the target market.

In some embodiments, the determination of the target market may be made based upon data stored in cookies in a web browser of the website administrator 110, a URL visited by the website administrator 110, the IP address of the website administrator, and/or an accept language of the web browser of the website administrator 110 (e.g., the language specified in an accept-language header communicated in requests for web pages issued by the web browser). Once determined, the target market can be used to render any web page provided by the server 106 to the website administrator 110 in a language compatible with the target market. Similarly, any user interfaces of any applications 114 served up by server 106 to the website administrator 110 as well as any content thereof may similarly be rendered in a language compatible with the target market.

In one example, the website administrator 110 may have an IP address that is located in Switzerland. As such, the target market may initially be set to a country of Switzerland. Then, the website administrator 110's browser is analyzed to identify an accept language—this may be necessary because Switzerland has a number of predominant languages. If the browser has an accept language of the default language (i.e., German), the target market is set to Switzerland—German. But if the website administrator 110 has a different accept language (e.g., French or Italian), the target market can be set accordingly.

Figure 3:
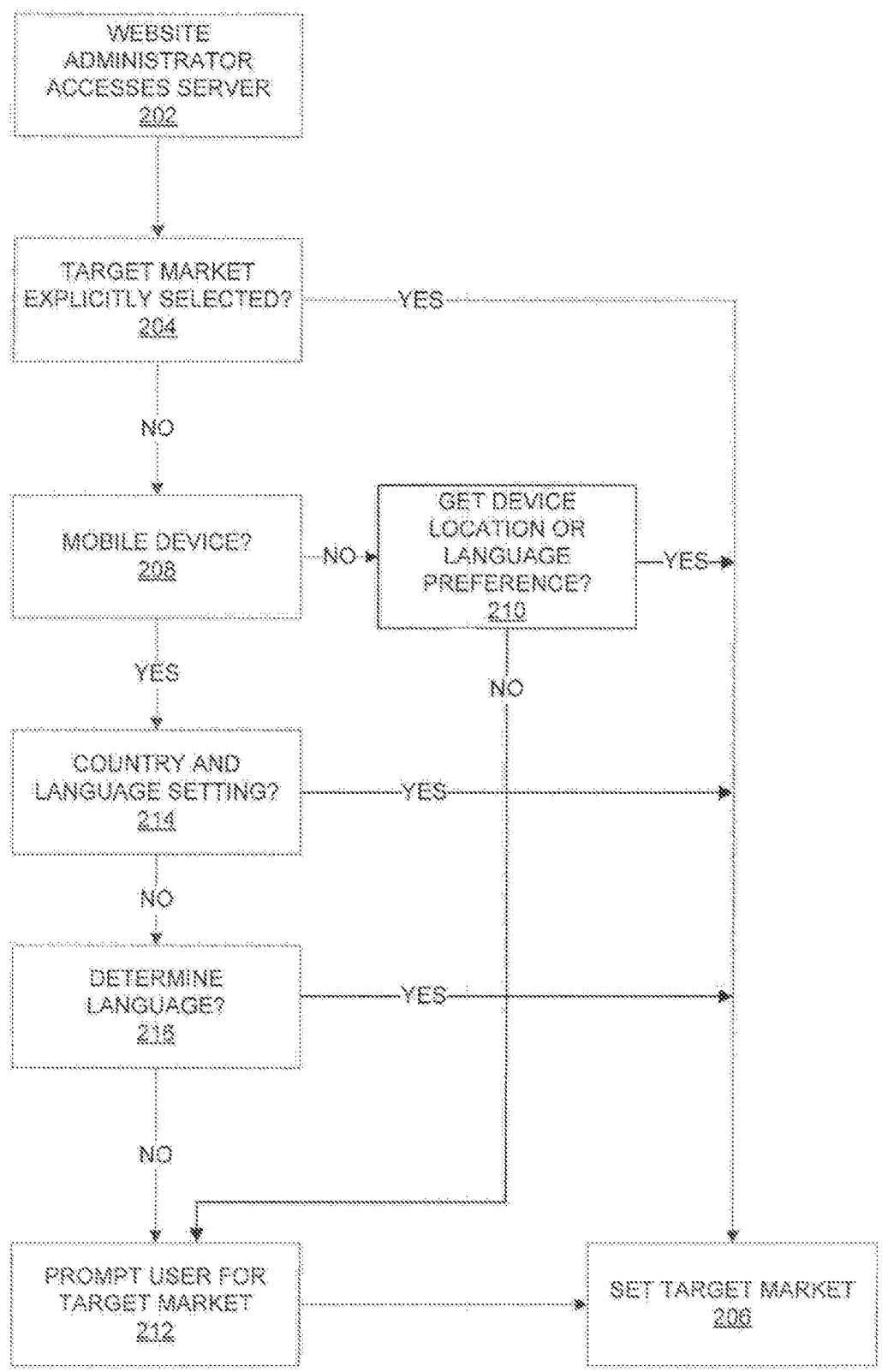
FIG. 3 is a flow chart illustrating an example method by which a target market for a website of a website administrator can be determined.

FIG. 3 is a flow chart illustrating an example method by which a target market for the website 104 of a website administrator 110 can be determined. In step 202 the website administrator 110 accesses server 106. The website administrator 110 may communicate with server 106 to create a website 104 or to modify the content of an existing website 104. In step 204 the server 106 determines whether the website administrator 110 has explicitly selected or specified a target market. An explicit target market selection could be made using a pull-down menu provided by one or more web pages hosted by the server 106. For example, if the website administrator 110 must log-in to a webpage before accessing and modifying the website 104, the log-in screen (or a webpage subsequently displayed for the website administrator 110) may allow the website administrator 110 to explicitly select a target market. Alternatively, the website administrator 110 may provide information while browsing other web pages provided by server 106 (e.g., product pages, e-mail services, other websites 104 maintained by third parties, and the like) that can be used to determine the target market.

If, in step 204 it is determined that the website administrator 110 has explicitly selected a target market, the method moves to step 206 where the server 106 sets the target market to that explicitly selected by the website administrator 110.

If, in step 204, the target market has not been explicitly selected, in step 208 the server 106 determines whether the website administrator 110 is accessing the server 106 with a mobile device. The determination of whether the website administrator 110 is accessing the server 106 with a mobile device may be made by the server 106 analyzing the browser settings of the device used by the website administrator 110 to access the server 106. Generally requests sent to the server 106 from the browser will have a "HTTP USER AGENT" Value in a header of the request that can be used by the server 106 to determine if the request is coming from a mobile device. If not (e.g., the website administrator 110 is using a desktop computer), in step 210 the server 106 attempts to determine the location of the website administrator 110 as well as any language preferences of the website administrator 110. As discussed above, the location can be determined by analyzing the IP address of the computer being used by the website administrator 110, though any other suitable geolocation approach may be utilized. The language preferences may be established by the website administrator 110 via, for example, web browser settings.

If, in step 210, the server 106 is able to determine a location of the website administrator 110 or the language preferences of the website administrator 110, that location or language preference information is used to set a target market for the website administrator 110. As discussed above, this may be done using a look-up table that translates location and/or language preferences into a target market.

If, however, in step 210 the server 106 is unable to determine either the location or the language preferences of the website administrator 110, the server 106 may prompt the website administrator 110 to explicitly select or specify a target market in step 212. Once explicitly selected or specified by the website administrator 110, the target market is set in step 206.

Returning to step 208, if the website administrator 110 is accessing the server 106 using a mobile device, the server will, in step 214 determine whether the mobile device has a preferred country and/or language setting. If so, that preferred country and/or language setting is used to set the target market in step 206, for example, by setting the region of the target market equal to the country setting on the mobile device and the language of the target equal to the language setting of the mobile device. If the mobile device does not have a preferred country/language setting, in step 216 the server 106 determines whether the mobile device has a preferred language setting. If so, that preferred language setting is used to set the target market in step 206. Again, this may be done using a look-up table that translates a language preference into a target market.

In some embodiments, however, because mobile devices have a higher likelihood of being located away from the target market for the website 104, the server 106 may be configured to ignore the country setting on a mobile device, even if one is set. In that case, only the language setting (assuming that one is available) will be used to determine the target market.

If the mobile device does not have a preferred language setting, in step 212 the website administrator 110 is prompted to explicitly specify a target market. Once explicitly selected, the target market is set in step 206.

After the target market has been specified for the website 104 of the website administrator 110 (e.g., using the method of FIG. 3), server 106 can use that target market information to customize both the user interfaces to the applications 114 that the website administrator 110 may use in constructing, revising, and marketing the website and the content (including media 118 and widgets 120) that may be incorporated into the website 104.

For example, the user interface provided to the website administrator 110 by one or more applications 114 may be rendered in the language associated with the target market. In fact, the applications 114 that are made available to the website administrator 110 may be determined by the target market so that one target market will cause a first set of applications 114 to be available, while a second target market will cause a second set of applications 114 to be available. Similarly, the content made available for incorporation into the website 104 by the applications 114 may include only media 118 and widgets 120 suitable for or associated with the target market or may display media 118 and widgets 120 suitable for the target market in a preferred placement within the user interface of the applications 114 as compared to less suitable media 118 and widgets 120.

In some situations, the server 106 may not be specifically configured to serve up content and applications 114 configured for the target market determined, for example, according to the method of FIG. 3. In that case, the server 106 may instead serve up content and applications 114 suitable for a different target market, where the language of the target market selected by the server 106 is that same as that of the website 104. For example, if the target market for the website 104 is a region in Africa where English is the predominant language, but the server 106 is not configured for that African target market, the server 106 may instead serve up content and applications 114 for the target market United Kingdom—English (i.e., another target market sharing the same language). Similarly, the target market France—Français may be utilized as a default target market for other target markets having a language of Français and for which the server 106 is not configured. In some embodiments, a default target market may be defined. If the target market for the website 104 is one for which the server 106 is not configured and no other target markets of server 106 share the same language, the default target market may instead be used.

In one example, an application 114 may include a website builder. A website builder is a tool designed to assist a user in creating and modifying content for a website. The website builder may display the website's source code and allow a website administrator to modify the website's source code directly, thereby enabling fine control of the website's content, or provide a what-you-see-is-what-you-get (WYSIWYG) interface that enables the user to edit the website in its final as-rendered form. Sometimes website builders enable the user to switch between source code and WYSIWYG views of the website being created and/or edited.

The website builder application may be provided, for example, via a website browser running on a conventional desktop computer system or a laptop. Alternatively, the website builder application may be executed via a mobile device, such as a smart phone. In that case, the interface of the website builder application may be configured to be suitable for display on a smaller screen and for user interactions involving tapping and dragging upon a touch screen. The website builder may be executed as a software program running on a computing device of the website administrator 110 (e.g., as native software), or may run within a web browser (e.g., as a hosted software application), or combinations thereof.

Figure 4:
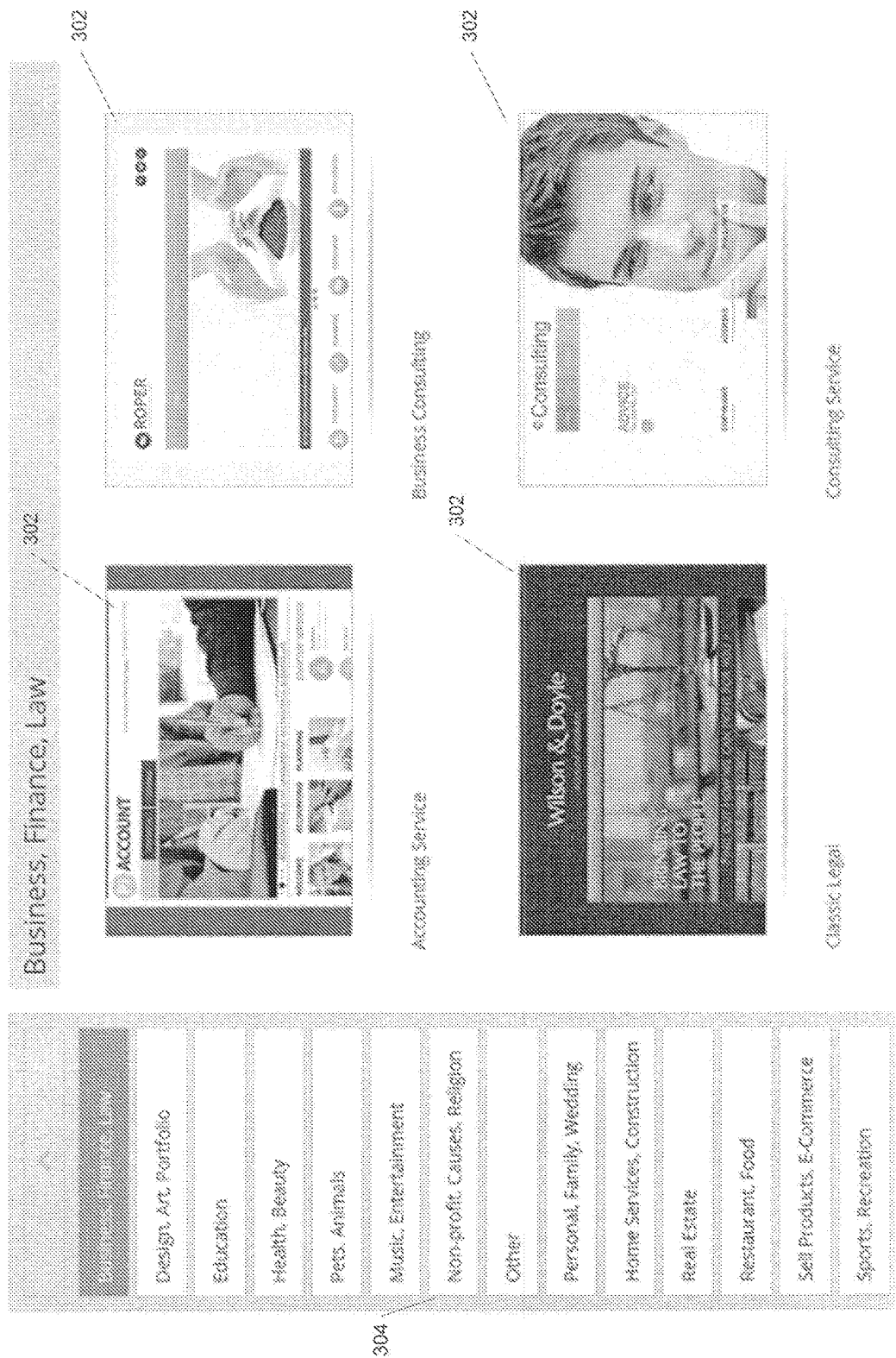
FIG. 4 is a screenshot showing an example user interface for a website builder application enabling a website administrator to select from a number of available templates.

Initially, the website administrator 110 accesses the website builder application to create a new website. Upon accessing the website builder application, the target market information, if available, can be used to select a preferred language in which the user interface of the website builder will be rendered. The website builder application will then prompt the website administrator 110 to select from a number of available website templates to begin constructing the website 104. FIG. 4 is a screenshot showing an example user interface for a website builder application enabling the website administrator 110 to select from a number of available templates 302.

The listing of templates 302 made available to the website administrator 110 may be filtered and/or sorted using the target market information. In some embodiments, the templates may be sorted into categories 304 that group the templates 302 based upon a template type. For example, there may be many different groups of templates suited to different types of business websites and personal websites. Templates may exist for websites for law firms, crafts stores, family blogs, bike shops, and the like. Each template category, therefore, can be associated with one or more target market in which templates belonging to that category may be popular.

Because different types of websites may be more popular in particular target markets (or some website-types may not even exist in particular target markets), the target market of the website administrator 110 can be used to sort the categories 304 of templates 302 so that the categories 304 of templates most relevant to the target market of the website administrator 110 are displayed first in a preferred placement location within the listing of available template categories 304, with less popular template types being displayed in a less prominent position or not displayed at all. In one specific embodiment, available template categories 304 are sorted alphabetically (though it may be possible to sort the categories 304 based on their popularity on a per-target market basis). Then a special category 304 designated "Recommended for You" is provided that contains templates 302 that are specific to the target market or otherwise particularly suited to the website administrator 110. The templates 302 in the "Recommended for You" category 304 can be sorted using the following logic: templates 302 that match both the language and location of the target market are displayed first, templates 302 that match only the language of the target market and not the location are displayed next, templates 302 that match the location of the target market and not the language are displayed next, and finally templates 302 that match neither the target market location nor the target market language are displayed last.

Within a particular category 304 of templates 302, as mentioned above, each template 302 is associated with one or more target markets. As such, the templates 302 that are associated with the same target market as the website 104 may be similarly displayed in a preferred position in the website builder as compared to templates 302 associated with target markets that do not match that of the website 104.

The preferred placement location for a category 304 or template 302 may comprise any location in the listing of categories 304 or templates 302 depicted by the website builder that may be more likely to attract the attention of a website administrator 110 using the website builder than another location. The preferred placement location, as non-limiting examples, may be determined by human factors, usability, or similar studies, or may be a simple arbitrary or intuitive choice. As illustrated in FIG. 4, it also may comprise a preferred placement of a category 304 within a vertical arrangement of a plurality of template categories 304, perhaps at the top of a list of categories 304, or simply a higher placement within such a list than the placement of other categories 304. The preferred placement may therefore, as non-limiting examples, comprise a top-most, bottom-most, or more centered position in any such vertical list.

Once a category 304 of templates 302 is selected, a number of templates 302 belonging to that category 304 can be displayed for selection by the website administrator 110. In a similar manner to that of the categories 304, the templates 302 themselves, once depicted, can be arranged so as to give templates 302 associated with the same target market as that of the website 104 a more prominent position in the website builder than templates 203 associated with different target markets.

In the example depicted in FIG. 4, the target market is one in which websites relating to pets and animals tend to be more popular than home services and construction. As such, within the listing of categories 304 of templates 302, the category associated with Pets, Animals is displayed above the category associated with Home Services, Construction. In this particular target market, websites associated with business, finance, and law may be extremely popular. As such, the category of templates dealing with Business, Finance, Law is displayed at the top of the list of available categories 304 of templates 302.

In the example shown in FIG. 4, the user has selected the category Business, Finance, Law, resulting in templates 302 falling within that category 304 being made available for selection. The listing of templates 302 shown in FIG. 4 may be similarly sorted based upon the relevancy of each template 302 to the target market. For example, templates 302 having multimedia (e.g., images or graphics) that depict scenes taken from the target market may be displayed above those that include multimedia depicting scenes taken from other markets. Similarly, templates 302 including text of the same language as the target market may be displayed above templates 302 that include text in a different language.

The placement of a particular category 304 or template 302 may be determined (perhaps by software and/or scripts running on at least one server), which may be based upon the target market of the website 104 and the target markets with which particular templates 302 or template categories 304 are associated. As described in detail above, the preferred placement may comprise any location on a website builder user interface that may be more likely to attract the attention of a user than another location.

As an example, wedding announcement websites may be quite popular in India, but less popular in the United States. Accordingly, if the target market for the website administrator 110 is India—Hindi, templates belonging to the category of wedding announcement websites may be made available for that administrator (and, in fact, the category 304 of wedding announcement site templates 302 may be given prominence in the website builder), while if the target market was United States—English, those templates 302 may not be displayed for selection by the website administrator 110 and the category 304 may be displayed at the bottom of a listing of available template categories 304, if shown at all.

The available templates 302 may also be sorted based upon other factors analyzed in combination with the target market. For example, if the customer records 122 for the website administrator 110 indicates that the website administrator 110 is affiliated with a business, categories 304 containing templates 302 associated with personal web pages (e.g., family blogs, personal photograph sharing websites, etc.) may be displayed in a less prominent position than the categories 304 of templates 302 associated with small business websites (or not displayed at all).

Generally, each template will include some preliminary content that can be used by the website administrator 110 to begin constructing the website. Once a template 302 is selected, the content of the template becomes the website administrator 110 website, and the website administrator 110 can begin editing and revising the content that was pre-loaded into the template 302.

The templates 302 may include a number of pre-built web pages that each may include media 118 (e.g., images, video, sounds, and the like) and/or text arranged within the template's web pages. In the present system, the media 118 and text incorporated into a particular template 302 will be well suited to the target market that is associated with the template 302. To the extent the multimedia includes written text or spoken words, the language can be the same as that of the language of the target market of the template 302. To the extent the multimedia depicts scenes that can be associated with a particular location, the location associated with the multimedia can fall within the geographical scope of the target market of the template 302.

For example, for a template associated with a target market defining a particular country (e.g., Spain—Spanish), images of cities or towns will depict Spanish cities or towns. Similarly, multimedia depicting individuals will show individuals wearing dress and/or performing activities associated with or consistent with locations falling within Spain.

Consequently, when the website administrator 110 is presented with a listing of candidate templates 302, the listed templates 302 will tend to include multimedia and text familiar to viewers from the target market, or at least those templates 302 may be displayed in a preferred location in the website builder as compared to other templates 302. This prevents the website administrator 110 from being presented with templates 302 that include content entirely unrelated to the target market or language that likely cannot be read by individuals within the target market.

Depending upon the system implementation, templates 302 that include multimedia and text not associated with the target market of the website administrator 110 may either not be displayed, or may be displayed below (or in a position of reduced prominence) to templates 302 including more relevant multimedia. In one embodiment, the templates 302 are sorted so that the templates 302 displayed first are those that match both the location and language of the target market, templates that match only the language of the target market are displayed next, with templates that match neither the location nor language of the target market are displayed last.

In various embodiments, the templates 302 may be generated in real-time with content (e.g., multimedia and text) that matches the target market or the website administrator 110. In that case, the web pages making up the templates 302 may be constructed as shells that specify the layout and location of content (e.g., multimedia and text) within the web pages, but, rather than incorporate the content, instead include tags, codes, or other placeholders that, when a template 302 is displayed for a particular target market can be replaced by suitable content for a particular target market.

The templates 302 may be associated with a single target market or, in other embodiments, may be associated with two or more target markets. For example, a template 302 may be associated with more than one target market provided that the target markets are tied to same language. For example, a template may be associated with the target markets MX-es (Mexico—Spanish) and AR-es (Argentina—Spanish).

Figure 5:
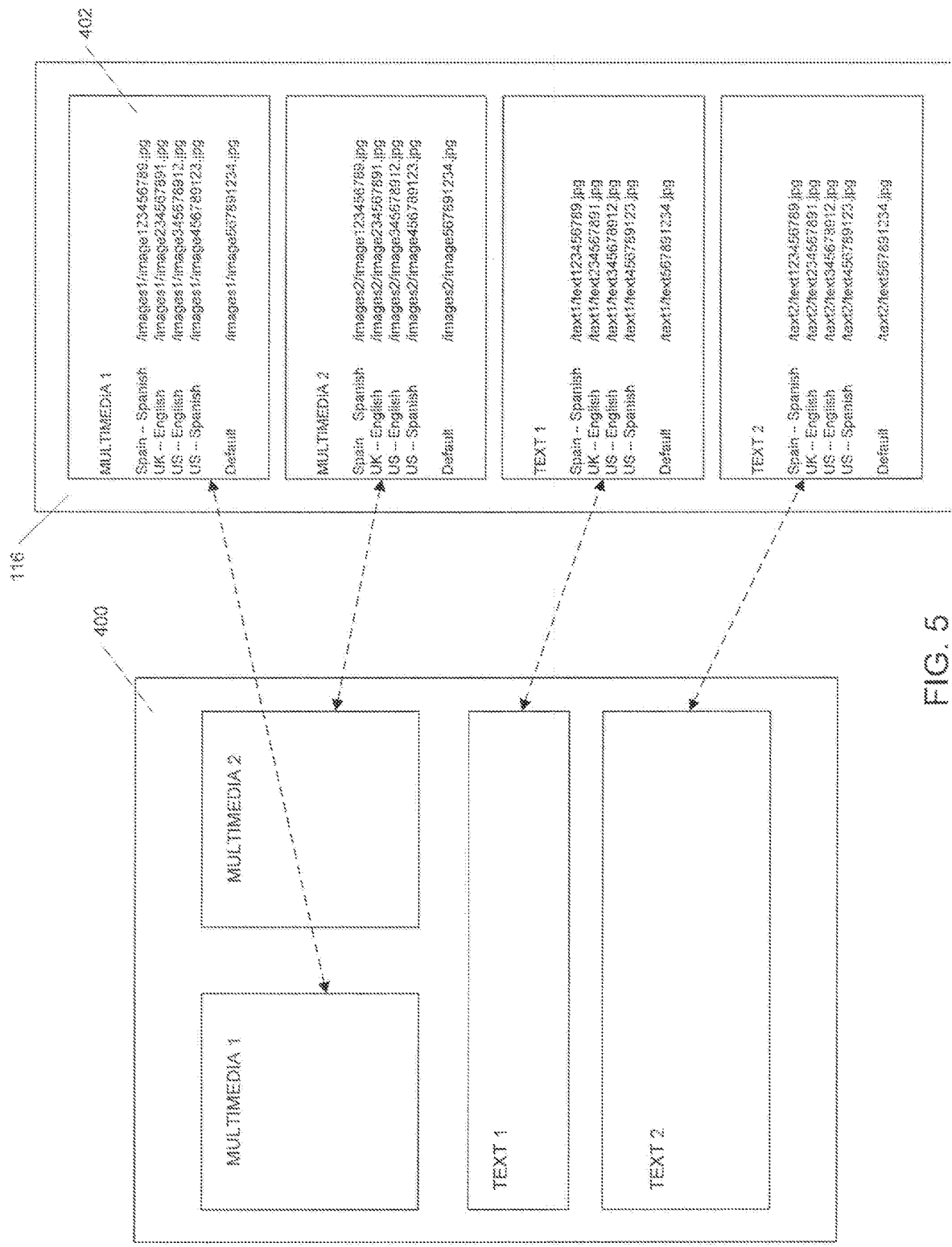
FIG. 5 depicts an example webpage of a template.

For example, FIG. 5 depicts an example webpage 400 from a template 302. In this configuration, the webpage 400 does not include content and instead includes placeholders indicating where content should be placed within the webpage 400. In this example, the webpage 400 includes two placeholders for multimedia positioned at the top of the webpage (MULTIMEDIA 1 and MULTIMEDIA 2). The webpage 400 also includes placeholders for text content positioned below the multimedia (TEXT 1 and TEXT 2).

Content database 116 contains the content that can replace the placeholders in webpage 400 when the template is displayed for selection by the website administrator 110. For each placeholder (MULTIMEDIA 1, MULTIMEDIA 2, TEXT 1, and TEXT 2), database 116 stores a number of different pieces of candidate content (in FIG. 5, the content is referenced via a uniform resource locator (URL)). Each piece of content is associated with a particular target market. When depicting the template for the website administrator 110, the most appropriate content based upon the target market of the website 104 is retrieved from database 116 and inserted into the template for depiction.

For example, referring to FIG. 5, database 116 stores a listing 402 of candidate images to replace the MULTIMEDIA 1 placeholder. When displaying the template 302 containing the webpage 400 for the website administrator 110, if one of the candidate images in the listing 402 matches both the location and language of the target market for the website 104, that image will be retrieved from the listing 402 in database 116 and inserted into the webpage 400. If none of the candidate images match both the location and language of the target market, the first image that matches the language of the target market may instead be retrieved and used to replace the placeholder MULTIMEDIA 1. Finally, if none of the images match the language of target market, the listing 402 of candidate images may include a default image that will replace the placeholder. A similar process may be utilized to select the most appropriate textual content for incorporation into the template.

Figure 6:
FIG. 6 is a screenshot showing a view of a website builder application that enables a website administrator to incorporate a widget into a website.

In some embodiments, the website builder application will also enable the website administrator 110 to incorporate one or more widgets into the website 104. FIG. 6, for example, is a screenshot showing a view of a website builder application that allows a website administrator 110 to incorporate one or more widgets into their website 104. In FIG. 6, the website builder present a WYSIWYG interface enabling a website administrator 110 to select and draft one of the widgets 502 to a desired location on a web page in the website 104.

In the present system, the widgets made available to the website administrator 110 are filtered based upon the target market for the website. Because some widgets 502 are more popular in some regions than others, widgets 502 that are more suitable for the target market of the website 104 will be displayed ahead of widgets that are less popular in the target market (or those widgets may not be displayed at all). For example, FACEBOOK may be popular in the United States and European countries and would be available as a widget for incorporation into a website having a target market in those locations. But FACEBOOK may be less popular than RENREN in China. Accordingly, for target markets located within China, the widget FACEBOOK may be replaced by a widget for RENREN.

Not only can the listing of available widgets 502 be determined by the target market of the website 104, but the content of the widgets 502 themselves can also be adjusted based upon the target market. Where the widgets are available in multiple languages, for example, the language of the widgets may be determined by the target market of the website 104. In some embodiments, the target market information is passed to the widget 502. Having received the target market information, the widget 503 can then render content and functionality related to that target market. Each widget 502 may be configured to respond differently to the target market information. For example, a FACEBOOK widget, upon receiving a target market of India—English may redirect users interacting with the widget to the Indian website for FACEBOOK, for example.

In some embodiments, the website builder application may enable the website administrator 110 to select from a number of temporary or permanent themes that may be applied to the website 104. The themes may be temporary additions to the website 104 and provide one or more stylistic elements (e.g., images, audio, and the like) that can overlay or be inserted into one or more of the web pages making up the website 104. The themes that are made available for selection by the website administrator 110 can be filtered based upon the target market of the website 104.

For example, if the target market for the website 104 is one in which the Christmas holiday is celebrated, the website builder may provide the website administrator 104 with an option to have a temporary Christmas theme automatically applied to the website during the days of the year associated with the holiday. A Christmas theme may involve, for example, displaying a number of Christmas-themed visual elements within the website 104, or incorporating Christmas music into the website 104 during the Christmas season. Similarly, for target markets that utilize the Chinese calendar, themes may be made available to automatically depict elements celebrating the Chinese New Year on the website 104 at appropriate times. Accordingly, one a temporary theme is selected by the website administrator 104, the temporary theme may only be applied to the website 104 for a determined time period.

After the website administrator 110 finishes using the website builder application to construct the website 104, the website administrator 110 can publish the website 104 on server 106. If the website administrator 110 already has a domain name for the website 104, the website 104 can be published so that the domain name resolves to the website 104. In some cases, however, the website administrator 110 may need to register a domain name before the website 104 is published. In that case, the website builder application may be configured to suggest suitable domain names to the website administrator 110. The suggested domain names may be based, at least in part, on the target market for the website 104. For example, the suggest domain names may include domain names having a country code describing a country that contains the target market.

In some embodiments, the website builder application may enable the website administrator 110 to incorporate a shopping cart function into the website 104. Where the website 104 advertises a number of goods and/or services for sale, for example, a shopping cart may be provided to enable a potential customer to browse through the website 104 to review the various available goods and services. After reviewing various attributes of the goods or services being offered, including the price associated with the goods or services, the customer can add one or more of the goods or services to their shopping cart. In this manner one or more goods or services may be accumulated within the customer's shopping cart.

When the customer has finished shopping, they can initiate a check out process enabling the customer to pay for the goods or services that have been added to the customer's shopping cart. The check out process involves the website 104 prompting the customer to supply information enabling a monetary payment to be made in exchange for the goods or services. In many cases this involves the customer providing a credit card or debit card number that can be used to execute a payment. In many other implementations, however, other forms of payment, such as gift cards, coupons, electronic money transfers, exchanges of electronic currency, deferred payment (e.g., in anticipation of taking possession of the goods or services at a later date at which time payment may be rendered), escrow, and the like, may be used to render payment at check out.

Depending upon the market in which a particular transaction is taking place, different forms of payment may be preferred over other forms of payment. For example, in the United States, credit cards (and particularly cards relying on the VISA and MASTERCARD processing networks) are popular mechanisms for rendering payment. In contrast, in India, debit cards may be preferred over credit cards. In China, meanwhile, systems such as ALIPAY may be preferred methods of electronic payment.

Because the preferred payments mechanisms may differ based upon the target market, the present system and method can use the target market for the website 104 to at least partially determine the configuration of a shopping cart system that may be incorporated into the website.

Figure 7:
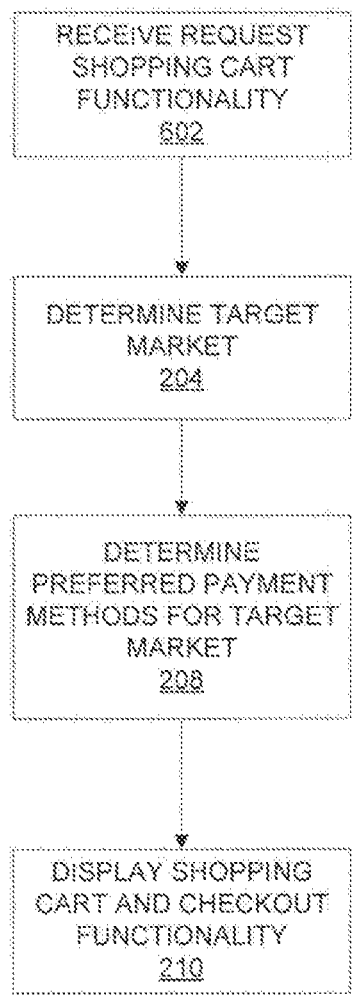
FIG. 7 is a flowchart illustrating a method for incorporating shopping cart functionality into a website, where the shopping cart is tailored to a particular target market for the website.

FIG. 7, for example, is a flowchart illustrating a method for incorporating shopping cart functionality into a website, where the shopping cart is tailored to a particular target market for the website. In step 602, the website administrator 110 (e.g., using the website builder application) requests that shopping cart functionality be added to the website 104. Following that request the target market for the website 104 is determined in step 604.

With the target market for the website 104 identified in step 604, in step 606 the preferred payment methods for the target market are identified. The preferred payment methods may be identified, for example, by consulting a look-up table that maps target markets to one or more preferred payment methods. The preferred payments methods may be identified in any suitable manner. For example, for a given target market a number of historical transactions may be analyzed to identify the preferred payment methods for the customers that entered into those transactions, which can then be defined as the preferred payment methods for that target market. Alternatively, the preferred methods may be determined by a governmental agency within the target market. For example, if a particular region (e.g., country) forbids a particular payment method, that payment method may be disfavored for the target market.

Once the preferred payment methods have been identified, a shopping cart function can be provided on the website 104 in step 608. The shopping cart function allows a potential customer to add one or more items to the shopping cart and then undergo a checkout process. Upon checkout the customer will be able to select one of the preferred payment methods identified in step 606 to process the transaction.

When performing the method of FIG. 7, steps 606 and 608 may be executed at the time the shopping cart functionality is added to the website 104—that is, while the website administrator 110 is using the website builder application to modify the website 104. Or, alternatively, steps 606 and 608 may instead be executed when the website 104 is visited by a potential customer. In that case, if the listing of preferred payment methods for a particular target market should change, when steps 606 and 608 are performed the updated list of preferred payment methods will be identified. As such, the website administrator 110 would not be required to re-add the shopping cart functionality to the website 104 each time the preferred payment methods for the target market of the website 104 is updated.

In addition to adjusting the payment methods based upon the target market of the website 104, the currency used to display any prices may automatically be adjusted to match the currency used in the target market. Similarly, the prices themselves may be adjusted based upon the target market of the website 104. To facilitate the customer calculating and verifying shipping costs, such shopping carts will display an attribute of the product such as its shipping weight and dimensions. If those attributes are to be displayed, the target market can be analyzed to determine the most suitable units for depicting those attributes. In some cases, when the customer attempts to check out and purchase certain products, an analysis can be performed to determine whether the products are, in fact, legal for sale in the target market. If not, the check out process can be interrupted preventing the sale.

In some cases, historical records of a number of transactions executed through the website 104 may be analyzed to determine payment methods that are popular with the customers of the website 104. This may be useful, for example, if a particular website 104 tends to enter into transaction using payment methods that are not particularly popular within the target market.

In some cases, different target markets impose different legal requirements on information that must be communicated to a customer at the time of a transaction. The information may include details on a return policy and information describing how the transaction will be secured and, in fact, the technology that must be used to secure a particular transaction. In that case, the shopping cart functionality may be arranged to deliver any necessary information at the time of check out based upon the target market of the website 104 as well as impose security technology as required in the target market.

In various embodiments, the target market can be used to adjust the form that a customer completes when making a purchase. If, for example, the target market is the United States—Spanish, the form may be displayed in Spanish, and include text boxes allowing a user to enter their US state. Conversely, if the market it United Kingdom—English, the form may be displayed in English and include a text box allowing a user to enter the county in which they live. In a similar manner, the target market can be used to adjust any units displayed at checkout. For example, to assist a customer in calculating or verifying shipping costs, the anticipated weight and size of the product being purchased can be displayed in units suitable for the target market.

In some target markets, it may be routine to add a tip to particular product or service purchases. Accordingly, for target markets where tipping is routine, the shopping cart functionality may be modified (e.g., by adding a user input device enabling a user to specify a tip amount at checkout) to enable tipping. For target market in which tipping is not customary or even offensive, the tipping option may not be incorporated.

Figure 8:
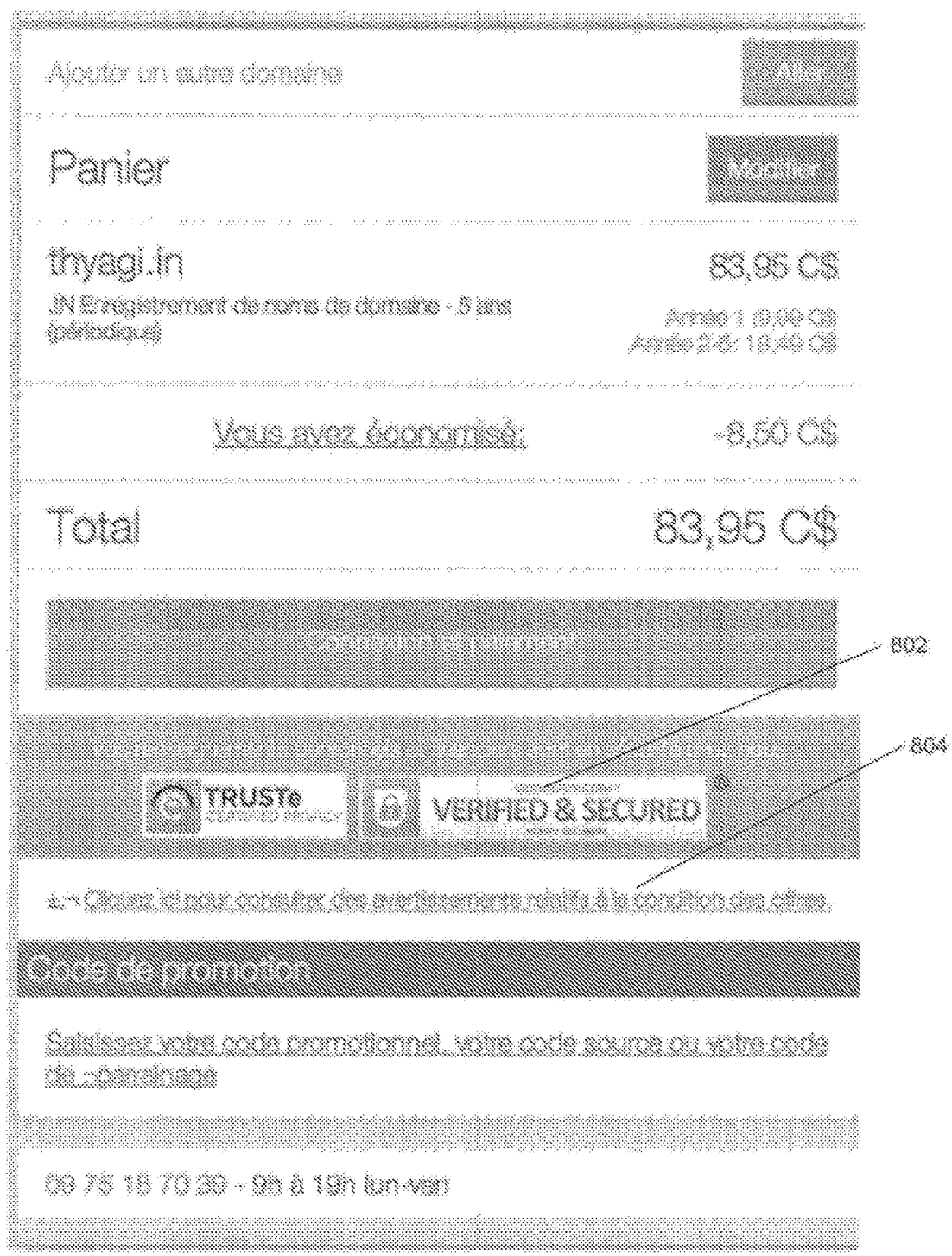
FIG. 8 is a screenshot showing a shopping cart function in a website where the shopping cart function has been configured for a particular target market.

FIG. 8, for example, is a screenshot showing one view of a shopping cart functionality that has been configured for a particular target market. In the example of FIG. 8, the target market is Canada—Français. As such, the text of the screenshot is rendered in French, while the currency amounts have been depicted in Canadian dollars. The user interface depicted in FIG. 8 includes mechanisms 802 for ensuring the security of the transaction. The particular security mechanisms made available may also be tailored to a particular target market. The user interface may also provide a link 804 enabling the shopper to learn the conditions of the pending offer, where the conditions may also be tailored to the target market.

As detailed above, a number of attributes of a website 104 can be modified based upon the target market of the website 104. This may involve modifying the content of the website to incorporate multimedia (e.g., images, sounds) and text associated with the target market. Similarly, any shopping cart function incorporated into the website 104 may be adjusted based upon the target market to ensure customers have a familiar experience during check out. As mentioned above, the target market for a particular website 104 may be determined based upon attributes of the website administrator 110, the website 104, or visitors to the website 104. The target market may be determined a single time for the website 104 (e.g., at the time of creation) or may be routinely revaluated and updated or modified. In some cases, the target market can be calculated in real time with every visit to the website 104. In that case, the target market may be determined by an attribute of the visitor, such as the location in which the visitor resides or the language preferences of the visitor. For example, for a particular visitor to the website 104, the visitor's IP address can be used to calculate a location of the visitor. That location can then be used to determine a target market. That target market can then be used to determine the content generated and transmitted to the visitor in displaying the website 104 to the visitor. This may involve, for example, incorporating content, such as multimedia and text, into the web pages of the website 104 that is suitable for the target market (e.g., by populating a template with suitable media and text). Similarly, any attributes of any widgets or shopping cart functionality incorporated into the website 104 can be adjusted based upon the target market determined by the visitor's location. In this manner, a customer located in the United Kingdom wishing to purchase a product from a website 104 may have a target market of United Kingdom—English and would see, upon going through a check out process, payment methods that are the preferred payment methods in the United Kingdom and prices listed in British Pound Sterling. This would be the case even if the website 104 would otherwise have a target market of France—Français.

In many circumstances, a website administrator 110 will undertake a marketing or advertising campaign to promote traffic to the website 104. To assist in such a campaign, the hosting product hosting server 106 may provide one or more applications 114 enabling the website administrator 110 to initiate and manage a marketing campaign for the website 104.

When initiating a marketing campaign, different approaches can have different levels of success in different markets. For example, in the United States and Europe, it can be very important to have a good keyword ranking with the search engine GOOGLE in order to drive traffic to your website 104. In other target markets, however, other searches engines may be more powerful making it more important to have a good ranking with those search engines. Similarly, depending upon the target market, it can be important to place advertisements upon different types of websites or work with different advertising networks that are more suited to the target market.

Accordingly, in accordance with the present disclosure, the advertising application provided by the hosting provider for the website 104 can be tailored to provide options and suggestions that best suited to advertising the website 104 in the target market. The advertising application, for example, may use the target market information to publish a newly created website 104 (e.g., constructed using the website builder application) to the most popular listing services within the target market (e.g., the YELP listing service in US and the JustDial listing service in India. The advertising application may also provide search engine optimization (SEO) for the website 104 in the target market.

Various embodiments of the present invention may be embodied in many different forms, including, but in no way limited to, computer program logic for use with a processor (e.g., a microprocessor, micro controller, digital signal processor, server computer, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as C, C++, or JAVA) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

In one embodiment, a method including receiving, by one or more computer servers, a request to access an application from a user, determining, by the one or more computer servers, at least one of a preferred language of the user and a location of the user, determining, by the one or more computer servers, a target market using the at least one of the preferred language of the user and the location of the user, the target market defining a language and a region, and rendering, by the one or more computer servers, the application by modifying at least one of a user interface of the application and a content of the application using the target market.

In another embodiment, a method includes receiving, by one or more computer servers, a request to at least one of create and modify a website using an application from a user, determining, by the one or more computer servers, a target market for the website, the target market defining a language and a region, and rendering, by the one or more computer servers, the application by modifying at least one of a user interface of the application and a content of the application using the target market.

In another embodiment, a system includes one or more computer server communicatively coupled to a network, the one or more computer server including a processor configured to perform the steps of receiving, by one or more computer servers, a request to access an application from a user, determining, by the one or more computer servers, at least one of a preferred language of the user and a location of the user, determining, by the one or more computer servers, a target market using the at least one of the preferred language of the user and the location of the user, the target market defining a language and a region, and rendering, by the one or more computer servers, the application by modifying at least one of a user interface of the application and a content of the application using the target market.

In another embodiment, a method includes receiving, by one or more computer servers, a request for a web page from a user, the web page being configured to enable the user to perform a financial transaction, determining, by the one or more computer servers, a location of the user, determining, by the one or more computers servers, one or more preferred methods of payment for a geographical region including the location of the user, generating, by the one or more computer servers, web page content in response to the request, the web page content being configured to enable the user to use at least one of the one or more preferred methods of payment to perform the financial transaction, and transmitting, by the one or more computer servers, the web page content to the user.

In another embodiment, a method includes receiving, by one or more computer servers, a request for a web page from a user, determining, by the one or more computer servers, a location of the user, generating, by the one or more computer servers, web page content in response to the request, wherein at least one of an image in the web page and a text in the web page are at least partially determined by the location of the user, and transmitting, by the one or more computer servers, the web page content to the user.

In another embodiment, a system includes one or more computer server communicatively coupled to a network, the one or more computer service including a processor configured to perform the steps of receiving, by one or more computer servers, a request for a web page from a user, the web page being configured to enable the user to perform a financial transaction, determining, by the one or more computer servers, a location of the user, determining, by the one or more computers servers, one or more preferred methods of payment for a geographical region including the location of the user, generating, by the one or more computer servers, web page content in response to the request, the web page content being configured to enable the user to use at least one of the one or more preferred methods of payment to perform the financial transaction, and transmitting, by the one or more computer servers, the web page content to the user.

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Some embodiments provided for are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

The invention claimed is:

1. A system, comprising:
    a content database, the content database identifying:
        a plurality of media elements, each media element in the plurality of media elements being associated with a market selected from a plurality of markets, and
        a plurality of widgets, each widget in the plurality of widgets being associated with a market selected from the plurality of markets; and
    a computer server communicatively coupled to a network, the computer server including a processor configured to perform the steps of:
        receiving a request to access an application from a user, the application enabling the user to modify a content of a web page associated with the user,
        determining a target market of the web page,
            wherein the target market is associated with at least one geographical region of a plurality of geographical regions,
            wherein the determination of the target market is modified to incorporate particular multimedia based on a number of attributes associated with the user by populating a template with suitable media and text,
            wherein the number of attributes comprise the internet protocol address of the user and a language preference associated with the user,
        identifying a set of relevant media elements,
            wherein the set of relevant media elements includes media elements retrieved from the content database that are associated with markets that match the target market,
        identifying a set of relevant widgets,
            wherein the set of relevant widgets includes widgets retrieved from the content database that are associated with markets that match the target market,
        dynamically ranking each widget of the set of relevant widgets based on a keyword score associated with the media elements retrieved from the content database
            wherein the ranking of each widget comprises modifying the content database based on a real-time calculation of the number of attributes associated with the particular multimedia associated with the user and the target market, and
        rendering the application by generating a user interface of the application associated with the dynamic ranking of the set of relevant widgets that enables the user to insert at least one media element of the set of relevant media elements and at least one widget of the set of relevant widgets into the web page.

2. The system of claim 1, wherein the target market is defined by a geographical region.

3. The system of claim 1, wherein the application includes a website builder application.

4. The system of claim 3, wherein the processor is configured to perform the step of rendering, by the computer server, a plurality of website templates in the website builder application, each website template being associated with at least one target market, the website templates being ranked within the user interface of the application based upon the at least one target market associated with each website template.

5. The system of claim 4, wherein website templates associated with the at least one target market that is the same as the target market of the web page are displayed in a preferred placement within the user interface of the application.

6. The system of claim 1, wherein the processor is configured to determine a target market of the web page by receiving an indication of the target market of the web page from the user.

7. The system of claim 1, wherein the processor is configured to determine a target market of the web page by analyzing an origination location of a plurality of visitors to the web page.

8. The system of claim 1, wherein the processor is configured to determine a target market of the web page by:
   determining that the request was received from a mobile device; and
   determining the target market based upon at least one of a preferred language setting and a country setting on the mobile device.

9. A system, comprising:
   a content database identifying a plurality of content elements, each content element in the plurality of content elements being associated with a market; and
   a computer server communicatively coupled to a network, the computer server including a processor configured to perform the steps of:
      receiving a request to access an application from a user, the application enabling the user to modify a content of a web page associated with the user,
      determining a target market of the web page,
         wherein the target market is associated with at least one geographical region of a plurality of geographical regions,
      wherein the determination of the target market is modified to incorporate particular multimedia based on a number of attributes associated with the user by populating a template with suitable media and text,
      wherein the number of attributes comprise the internet protocol address of the user and a language preference associated with the user;
      identifying a set of relevant content elements from the content database using the target market of the web page,
      dynamically ranking each widget of the set of relevant widgets based on a keyword score associated with the media elements retrieved from the content database,
         wherein the ranking of each widget comprises modifying the content database based on a real-time calculation of the number of attributes associated with the particular multimedia associated with the user and the target market, and
      rendering the application by generating a user interface of the application associated with the dynamic ranking of the set of relevant widgets that enables the user to insert at least one of the set of relevant content elements into the web page associated with user.

10. The system of claim 9, wherein the plurality of content elements includes media elements and widgets.

11. The system of claim 9, wherein the target market is defined by a geographical region.

12. The system of claim 9, wherein the application includes a website builder application.

13. The system of claim 12, wherein the processor is configured to perform the step of rendering, by the computer server, a plurality of website templates in the website builder application, each website template being associated with at least one target market, the website templates being ranked within the user interface of the application based upon the at least one target market associated with each website template.

14. The system of claim 13, wherein website templates associated with the at least one target market that is the same as the target market of the web page are displayed in a preferred placement within the user interface of the application.

15. The system of claim 9, wherein the processor is configured to determine a target market of the web page by analyzing an origination location of a plurality of visitors to the web page.

16. The system of claim 9, wherein the processor is configured to determine a target market of the web page by:
   determining that the request was received from a mobile device; and
   determining the target market based upon at least one of a preferred language setting and a country setting on the mobile device.

17. A method, comprising:
   receiving a request to access an application from a user, the application enabling the user to modify a content of a web page associated with the user;
   determining a target market of the web page,
      wherein the target market is associated with at least one geographical region of a plurality of geographical regions,
   wherein the determination of the target market is modified to incorporate particular multimedia based on a number of attributes associated with the user by populating a template with suitable media and text,
   wherein the number of attributes comprise the internet protocol address of the user and a language preference associated with the user;
   identifying a set of relevant content elements from a content database using the target market of the web page;
   dynamically ranking each widget of the set of relevant widgets based on a keyword score associated with the media elements retrieved from the content database,
      wherein the ranking of each widget comprises modifying the content database based on a real-time calculation of the number of attributes associated with the particular multimedia associated with the user and the target market, and
   rendering the application by generating a user interface of the application associated with the dynamic ranking of the set of relevant widgets that enables the user to insert at least one of the set of relevant content elements into the web page associated with user.

18. The method of claim 17, further comprising rendering a plurality of website templates in the application, each website template being associated with at least one target market, the website templates being ranked within the user interface of the application based upon the at least one target market of each website template.

19. The method of claim 17, wherein determining the target market of the web page includes analyzing an origination location of a plurality of visitors to the web page.

20. The method of claim 17, wherein determining the target market of the web page includes:
   determining that the request was received from a mobile device; and
   determining the target market based upon at least one of a preferred language setting and a country setting on the mobile device.

* * * * *